United States Patent
Maegawa et al.

(10) Patent No.: US 8,190,721 B2
(45) Date of Patent: May 29, 2012

(54) EQUIPMENT SET GENERATION SUPPORT APPARATUS AND METHOD

(75) Inventors: Tomonori Maegawa, Tokyo (JP); Masahiro Ishiyama, Kawasaki (JP); Yusuke Doi, Yokohama (JP); Yu Kaneko, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 90 days.

(21) Appl. No.: 12/196,458

(22) Filed: Aug. 22, 2008

(65) Prior Publication Data

US 2009/0063678 A1 Mar. 5, 2009

(30) Foreign Application Priority Data

Aug. 24, 2007 (JP) ................. 2007-218764

(51) Int. Cl.
*G06F 15/177* (2006.01)

(52) U.S. Cl. .............. 709/221; 709/220; 709/223

(58) Field of Classification Search .............. 709/220, 709/221, 223
See application file for complete search history.

(56) References Cited

U.S. PATENT DOCUMENTS

| | | | | |
|---|---|---|---|---|
| 5,448,230 | A * | 9/1995 | Schanker et al. | 340/870.03 |
| 7,360,163 | B2 * | 4/2008 | Masuda | 715/748 |
| 7,397,464 | B1 * | 7/2008 | Robbins et al. | 345/173 |
| 7,427,927 | B2 * | 9/2008 | Borleske et al. | 340/870.02 |
| 7,639,157 | B1 * | 12/2009 | Whitley et al. | 340/870.02 |
| 2006/0176167 | A1 * | 8/2006 | Dohrmann | 340/506 |
| 2007/0179646 | A1 * | 8/2007 | Dempski et al. | 700/83 |
| 2009/0037193 | A1 * | 2/2009 | Vempati et al. | 705/1 |

FOREIGN PATENT DOCUMENTS

| | | |
|---|---|---|
| JP | 2002-189648 A | 7/2002 |
| JP | 2004-206494 | 7/2004 |
| JP | 2005-110218 A | 4/2005 |
| JP | 2005-130423 | 5/2005 |
| JP | 2007-122645 A | 5/2007 |
| JP | 2009-044247 A | 2/2009 |

OTHER PUBLICATIONS

Japanese Office Action dated Nov. 29, 2011 from corresponding JP Patent Appln No. 2007-218764.

* cited by examiner

*Primary Examiner* — Phuoc Nguyen
(74) *Attorney, Agent, or Firm* — Ohlandt, Greeley, Ruggiero & Perle, L.L.P.

(57) ABSTRACT

An equipment set generation support apparatus (a) acquires, from a plurality of equipments connected to a network, state change event information notifying a state change of each equipment and an occurrence time and date of the state change, (b) sets a detection condition including a start time and an end time of a detection period, (c) selects state change event information whose occurrence time and date of the state change falling within the detection period from the state change event information acquired, and (d) detects, from the plurality of equipments, a set of equipments whose states change in the detection period and a set of state values after the state change of each equipment based on the state change event information selected.

9 Claims, 5 Drawing Sheets

FIG. 1

First equipment set table

| Equipment identifier | Equipment type | Equipment name | Point identifier set |
|---|---|---|---|
| AC1 | Air conditioner | Air conditioner X | {AC1-BO1,AC1-AO1} |
| LT1 | Lighting | Lighting Y | {LT1-BO1} |
| BL1 | Blind | Blind X | {BL1-BO1,BL1-AO1} |
| LT2 | Lighting | Lighting Z | {LT2-BO1} |
| ... | ... | ... | ... |

FIG. 2

Point information table

| Point identifier | Point name | Area information |
|---|---|---|
| AC1-BO1 | Air conditioner X_switch | 3F south area |
| AC1-AO1 | Air conditioner X_temperature | 3F south area |
| BL1-BO1 | Blind X_switch | 3F south area |
| BL1-AO1 | Blind X_opening/closing switch | 3F south area |
| LT1-BO1 | Lighting Y_switch | 3F south area |
| ... | ... | ... |

| Point identifier | Current state value | State change occurrence date and time |
|---|---|---|
| LT1-BO1 | ON | 2007-03-03T08:00:00 |
| AC1-BO1 | ON | 2007-03-03T08:02:00 |
| AC1-AO1 | 28°C | 2007-03-03T08:05:00 |
| AC1-BO1 | OFF | 2007-03-03T12:00:00 |
| ... | ... | ... |

FIG. 5

| User ID | Second equipment set identifier | Equipment set name | Second equipment set |
|---|---|---|---|
| USER1 | DSVSET001 | 3F south area | {AC1,LT1,BL1} |
| USER1 | DSVSET002 | 3F south meeting room | {AC3,LT3} |
| USER2 | DSVSET003 | 2F north reception room | {AC5,LT5} |
| ... | ... | ... | ... |

FIG. 6

| User ID | Operation set identifier | Equipment set name | Operation set of second equipment set |
|---|---|---|---|
| USER1 | OPSET001 | Meeting | {{AC1-BO1,ON}, {AC1-AO1,28}, {LT1-BO1,ON}} |
| USER1 | OPSET002 | For lunch break | {{AC1-BO1,ON}, {AC1-AO1,28}, {LT1-BO1,OFF}} |
| USER2 | OPSET003 | At arrival time | {{LT1-BO1,ON}} |
| ... | ... | ... | ... |

EQUIPMENT SET GENERATION SUPPORT APPARATUS AND METHOD

CROSS-REFERENCE TO RELATED APPLICATIONS

This application is based upon and claims the benefit of priority from prior Japanese Patent Application No. 2007-218764, filed Aug. 24, 2007, the entire contents of which are incorporated herein by reference.

BACKGROUND OF THE INVENTION

1. Field of the Invention

The present invention relates to a system designed to save labor for operation/management of equipment.

2. Description of the Related Art

Protocols for connecting equipment in a building to a network and allowing a central system to monitor them have already been widely used (ex. BACnet, ANSI/ASHRAE standard 135-2004).

With the recent advances in equipment network technology, much attention has been paid to equipment cooperating operation by general users using a network. Assume that a user is to make a presentation in a facilities utilization room. In this case, if equipment is not networked, the user manually performs a series of operations of rolling down a screen in the facilities utilization room, dimming the lighting on the screen side, rolling down a blind, activating an AV system, and turning on a projector. In contrast, assume that the user sets a desired state in advance by using a networked equipment system. In this case, by simply notifying via the network that the user wants to make "presentation", he/she can easily perform equipment cooperating operation described above by using the network.

Setting methods for equipment cooperating operation in a small system in which an equipment manager and a user can be regarded as the same person, like a home network, include, for example, a method of setting an execution rule for equipment cooperating control in a controller as disclosed in patent reference 1 (JP-A 2005-130423(KOKAI)) and a method of making a controller store, as a macro, setting change notification responses from equipment each having a setting change notification mode as disclosed in patent reference 2 (JP-A 2004-206494 (KOKAI)).

However, a building has several thousand to several hundred thousand pieces of equipment, and includes many equipment sets as cooperation targets. In general, a building has different management domains for the management of an equipment network and an information network used for operation by each tenant.

In contrast, setting attribute information about equipment types and floors in equipment on the equipment system side makes it possible to form a system which prepares a window which allows general users to make searches with the attribute information. However, each user manually generates an equipment set, which is cumbersome and difficult.

As describe above, in order to implement flexible cooperating operation of equipment, a general user of a building needs to select cooperating operation targets (=second equipment set) from an equipment population (=first equipment set) permitted from an equipment system and set setting values (=operation set) for the respective equipment of the equipment set. This imposes a heavy load on the user.

BRIEF SUMMARY OF THE INVENTION

According to embodiments of the present invention, an equipment set generation support apparatus comprises:

an acquisition unit configured to acquire, from a plurality of equipments connected to a network, state change event information notifying a state change of each equipment and an occurrence time and date of the state change;

a setting unit configured to set a detection condition including a start time and an end time of a detection period;

a selection unit configured to select state change event information whose occurrence time and date of the state change falling within the detection period from the state change event information acquired by the acquisition unit; and a first detection unit configured to detect, from the plurality of equipments, a set of equipments whose states change in the detection period and a set of state values after the state change of each equipment based on the state change event information selected by the selection unit.

DETAILED DESCRIPTION OF THE INVENTION

Figure 1:
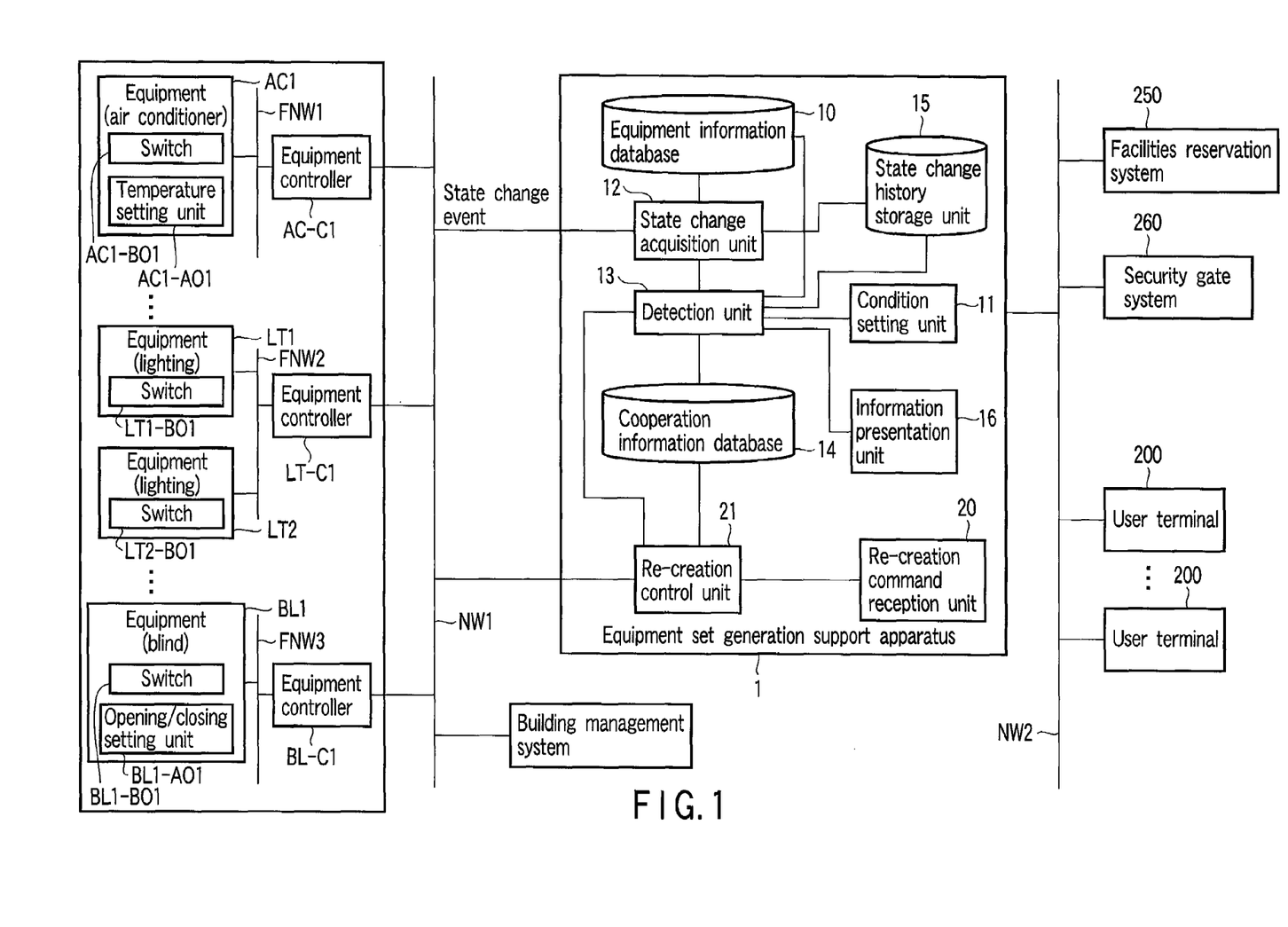
FIG. 1 is a block diagram showing an example of the arrangement of an equipment management system.

As shown in FIG. 1, an equipment management system according to an embodiment comprises equipment AC1, LT1, BL1, and LT2 as management targets installed in a building such as a factory or each area in a site including a plurality of buildings, an equipment set generation support apparatus 1, and the like which are connected to a network NW1.

In this case, the equipment AC1, LT1, BL1, and LT2 as management targets in the system shown in FIG. 1 are generally connected to each other via equipment controllers AC-C1, LT-C1, and BL-C1 and field networks FNW1, FNW2, and FNW3 such as serial lines or two-wire lines, which are generally installed for the respective types of equipment and are connected to the network NW1 via the equipment controllers. A user can perform setting operation for each equipment via the network NW1 and the equipment controller connected to the equipment. The equipment controller for each equipment notifies the equipment set generation support apparatus 1 and the like of the state of the equipment upon a change in state via the network NW1 or periodically.

An equipment is an arbitrary equipment, e.g., an air conditioner, lighting device, blind opening/closing device, power supply, or elevator, which allows setting operation and state notification via a network, and is installed in a predetermined building or site in advance. Each equipment is a shared device used by users of the building.

The equipment AC1 is an air conditioner installed in an area called a "third-floor south area" in the building, and includes a switch AC1-BO1, which turns on/off the power supply of the air conditioner, and a temperature setting unit AC1-AO1. A user can directly turn on/off the power supply or perform temperature setting by using the switch AC1-BO1 or the temperature setting unit AC1-AO1. The user can also turn on/off the power supply or set a temperature set value by using the switch AC1-BO1 or the temperature setting unit AC1-AO1 via the network NW1 and the equipment controller AC-C1.

The equipment LT1 is a lighting device which is installed in an area called the "third-floor south area" in the building and includes a switch LT1-BO1 which turns on/off the power supply of the lighting device. The user can directly turn on/off the power supply by using the switch LT1-BO1. The user can also turn on/off the power supply by using the switch LT1-BO1 via the network NW1 and the equipment controller LT-C1.

The equipment BL1 is a device which is installed in an area called the "third-floor south area" in the building to open/close the blind of a window and includes a switch BL1-BO1 which turns on/off the power supply of the device and an opening/closing switch BL1-AO1 for the blind. The user can directly turn on/off the power supply or open/close the blind by using the switch BL1-BO1 or the opening/closing switch BL1-AO1. The user can also turn on/off the power supply or open/close the blind by using the switch BL1-BO1 or the opening/closing switch BL1-AO1 via the network NW1 and the equipment controller BL-C1.

The equipment LT2 is a lighting device which is installed in an area called the "third-floor south area" in the building and includes a switch LT2-BO1 which turns on/off the power supply of the lighting device. The user can directly turn on/off the power supply by using the switch LT2-BO1. The user can also turn on/off the power supply by using the switch LT2-BO1 via the equipment controller LT-C1.

Note that the switch AC1-BO1 which performs setting control for the equipment AC1, the temperature setting unit AC1-AO1, the switch LT1-BO1 which performs setting control for the equipment LT1, the switch BL1-BO1 which performs setting control for the equipment BL1, the opening/closing switch BL1-AO1, and the switch LT2-BO1 which performs setting control for the equipment LT2 will sometimes be referred to as "points" hereinafter.

Assume that in the following description, the reference symbols of the respective pieces of equipment and the respective points will be used as identifiers without any change.

As the user operates the switches and setting units of the respective equipment, the states of the respective equipment change. When, for example, the switch LT1-BO1 is operated to turn on the power supply of the equipment LT1, the state of the point LT1-BO1 changes from OFF to ON. At this time, the equipment controller LT-C1 notifies the equipment set generation support apparatus 1 of state change event information indicating this state change via the network NW1. Notification is generally performed with respect to a broadcast address or multicast address of the network NW1, and the equipment set generation support apparatus 1 receives the state change event information notified to the address.

Although not the case in the following description, the network NW1 and the equipment set generation support apparatus 1 may not be directly connected to each other but may be connected to each other via some kind of protocol conversion gateway. In such a case as well, it suffices to properly convert a state change notification sequence in the gateway and make the equipment set generation support apparatus 1 receive state change event information in accordance with the converted protocol scheme.

State change event information includes the identifier of a point where a state change has occurred, a new state (current value) after the state change, the date and time when the state change has occurred, and the like. When a communication delay in the network NW1 is small enough to be ignored and the respective devices are synchronized with each other at the current time, the reception time on the event reception side can be regarded as the date and time when the state change has occurred.

The equipment set generation support apparatus 1 includes an equipment information database 10, a condition setting unit 11, a state change acquisition unit 12, a detection unit 13, a cooperation information database 14, a re-creation command reception unit 20, and a re-creation control unit 21.

Figure 2:
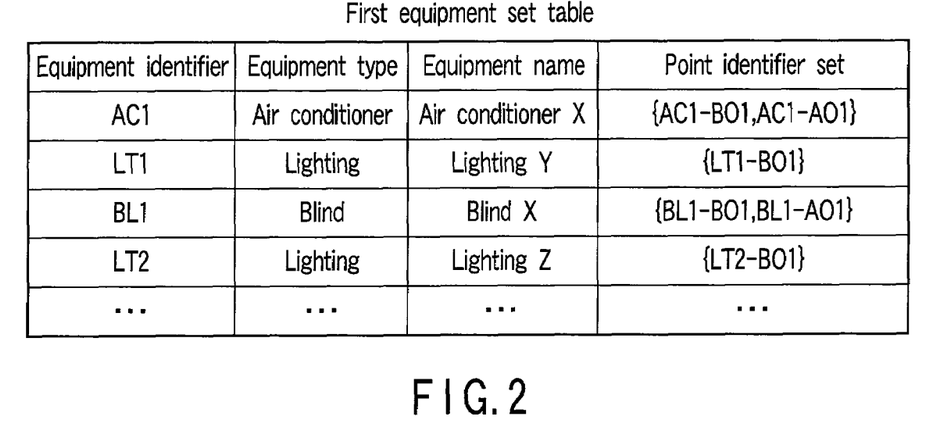
FIG. 2 is a view showing an example of a first equipment set table.
Figure 3:
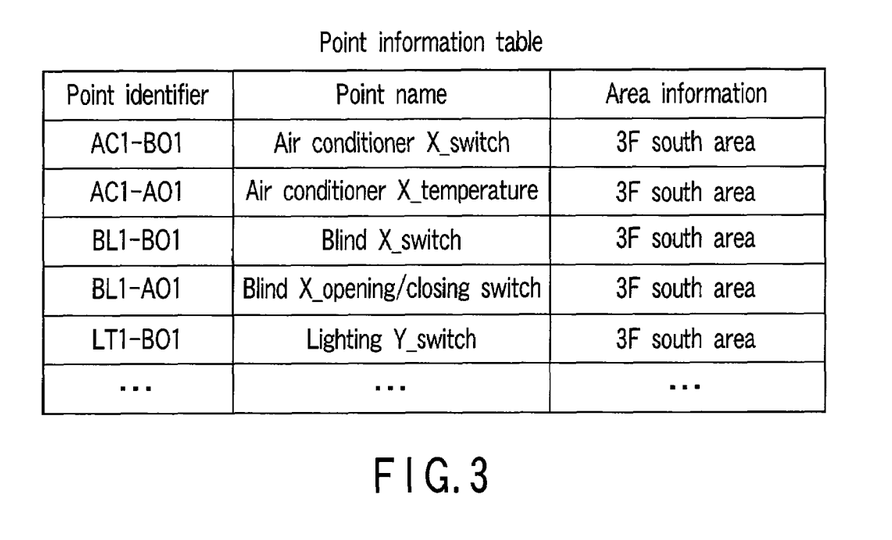
FIG. 3 is a view showing an example of a point information table.

The equipment information database 10 stores a first equipment set table like that shown in FIG. 2 and a point information table like that shown in FIG. 3. Note that a set of equipment to be managed by the system shown in FIG. 1 will be referred to as a first equipment set.

As shown in FIG. 2, the identifiers (equipment identifiers) of the respective equipment (to be managed) belonging to the first equipment set, equipment types, equipment names, and a set of the identifiers of points which the respective equipment has are stored in the first equipment set table.

For example, in the case of the equipment AC1, "AC1" as an equipment identifier, "air conditioner" as an equipment type, "air conditioner X" as an equipment name, and "AC1-BO1, AC1-AO1" as a point identifier set are registered in the first equipment set table.

In the case of the equipment LT1, "LT1" as an equipment identifier, "lighting" as an equipment type, "lighting Y" as an equipment name, and "LT1-BO1" as a point identifier set are registered in the first equipment set table.

As shown in FIG. 3, the point identifiers of the respective points, point names, and pieces of information (area information) indicating areas in which the respective points are installed are stored in the point information table.

For example, in the case of the switch AC1-BO1 of the equipment AC1, "AC1-BO1" as a point identifier, "air conditioner X_switch" as a point name, and "third-floor south area" as area information are registered in the point information table.

In the case of the switch BL1-BO1 of the equipment BL1, "BL1-BO1" as a point identifier, "blind X_switch" as a point name, and "third-floor south area" as area information are registered in the point information table. In the case of the opening/closing switch BL1-AO1 of the equipment BL1, "BL1-AO1" as a point identifier, "blind X_opening/closing switch" as a point name, and "third-floor south area" as area information are registered in the point information table.

The equipment set generation support apparatus 1 shown in FIG. 1 detects, for each user, a second equipment set as a set of equipment conforming to the object of the user from the first equipment set, and also detects a set of set values (state values) (an operation set) of the respective equipment belonging to the second equipment set.

The equipment set generation support apparatus 1 is connected to the plurality of equipment to be managed via the network NW1, and is also connected to a plurality of user terminals 200, a facilities reservation system 250, a security gate system 260, and the like via the network NW2 so as to be communicable with each other. Note that the network NW1 and the network NW2 may be the same network or different networks.

The condition setting unit 11 sets detection conditions required to detect the second equipment set and its operation set. The user sets detection conditions required to detect the second equipment set in the condition setting unit 11 by inputting desired detection conditions from the user terminal 200.

Detection conditions include the start and end dates and times of a detection period. The detection conditions can also include a user ID, area information for limiting the installation place of equipment to be detected as a second equipment set, an object, and the like.

Variations of the expression of a detection period include, for example, a method of specifically designating start date and time and a detection period in the form of setting a detection period like setting a period of 3 minutes from 10 a.m. However, this method falls within the range of system tuning, a description of the method will be omitted.

As described above, the user can input the respective items of search conditions from the user terminal 200, or the condition setting unit 11 can access the facilities reservation system 250, the security gate system 260, or the like and extract the above detection conditions from the facilities utilization schedule information of each user and work record information such as the arrival and leaving times of the user.

The facilities utilization schedule information reserved by the user is stored in the facilities reservation system 250. Facilities utilization schedule information includes information, for example, a user ID, the facility to be used (place), and date and time (facilities utilization scheduled start date and time/facilities utilization scheduled end date and time).

The condition setting unit 11 extracts detection conditions from the facilities utilization schedule information of each user by accessing the facilities reservation system 250 periodically or in accordance with an instruction from the user terminal 200 of the user. Every time new facilities utilization schedule information is registered in the facilities reservation system 250, the facilities reservation system 250 may notify the condition setting unit 11 of the new facilities utilization schedule information.

The condition setting unit 11 extracts two detection conditions including information such as the start and end time points of a detection period, an area, an object, and the like from the above facilities utilization schedule information.

One of the two detection conditions is a detection condition for the facilities utilization start time. For example, a time point a predetermined period before (e.g., several or several tens of minutes) facilities utilization scheduled start date and time is set as the start time point of a detection period, and a time point a predetermined period after (e.g., several or several tens of minutes) the facilities utilization scheduled start date and time is set as the end time point of the detection period. The facilities utilization room scheduled by facilities utilization schedule information is set as an area in detection conditions, and an object is expressed as "facilities utilization", "start of facilities utilization", or the like.

The other condition is a detection condition for a facilities utilization end time. The condition setting unit 11 sets a time point a predetermined period (e.g., several or several tens of minutes) before facilities utilization scheduled end date and time as the start time point of a detection period, and a time point a predetermined period (e.g., several or several tens of minutes) after facilities utilization scheduled end date and time is set as the end time point of the detection period. The facilities utilization room scheduled by facilities utilization schedule information is set as an area in detection conditions, and an object is expressed as "facilities utilization", "end of facilities utilization", or the like.

Work record information such as the arrival and leaving times of a user are input via the IC card reader of the security gate system 260, and is stored in a database in the security gate system 260, together with, for example, the user ID and division of the corresponding user.

The condition setting unit 11 extracts detection conditions from the work record information of each user by accessing the security gate system 260 in accordance with an instruction from the user terminal 200 of the user or periodically. If the security gate system 260 can detect the first worker who arrives at the office and the last worker who leaves the office, the security gate system 260 may notify the condition setting unit 11 of the arrival time of the first worker who arrives at the office, the leaving time of the last worker who leaves the office, and the like upon detecting them.

The condition setting unit 11 can extract a detection condition for the arrival time of a user from the work record information of the user. For example, a time point a predetermined period before the arrival time in the work record information is set as the start point of a detection period and a time point a predetermined period after the arrival time is set as the end time point of the detection period. Assume that the work record information includes an area where the division of the user is present, an area where the desk of the user is present, or the like, or that user information is acquired from a user information database or the like. In this case, the acquired information is used as area information as a detection condition. In addition, an object is expressed as "at arrival time" or the like.

The condition setting unit 11 can extract a detection condition for a leaving time from the work record information of the user. For example, a time point a predetermined period before the leaving time in the work record information is set as the start time point of a detection period and a time point a predetermined period after the leaving time is set as the end time point of the detection period. Assume that the user information includes an area where the division of the user is present, an area where the desk of the user is present, or the like, or that user information is separately acquired from a user information database or the like. In this case, the acquired information is used as area information as a detection condition. In addition, an object is expressed as "at leaving time" or the like.

Every time the state of each equipment changes, the equipment controller on the network NW1 transmits state change event information including a point identifier, a new state (current value) after the state change, the date and time when the state change has occurred, and the like. The state change acquisition unit 12 receives this state change event information.

Every time receiving state change event information, the state change acquisition unit 12 stores it in a state change history storage unit 15.

The detection unit 13 detects a second equipment set and its operation set by using state change event information, of the state change event information stored in the state change history storage unit 15, whose state change occurrence date and time fall within a detection period set as a detection condition, the first equipment set table and point information table stored in the equipment information database 10, and the detection conditions.

The cooperation information database 14 stores the second equipment set and its operation set detected by the detection unit 13.

An information presentation unit 16 presents the information detected by the detection unit 13 to the user terminal 200 via a network NW2.

The re-creation command reception unit 20 detects the activation timing of the re-creation control unit 21 from the information input from the user terminal 200, facilities utilization schedule information, work record information, or the like on the basis of set re-creation conditions.

The re-creation control unit 21 is activated by the re-creation command reception unit 20 to read the second equipment set and its operation set designated by the re-creation conditions from the cooperation information database 14 and re-create the operation set in the second equipment set on the network NW1.

The processing operation of the equipment set generation support apparatus 1 will be described next with reference to the flowchart shown in FIG. 4.

Figure 5:
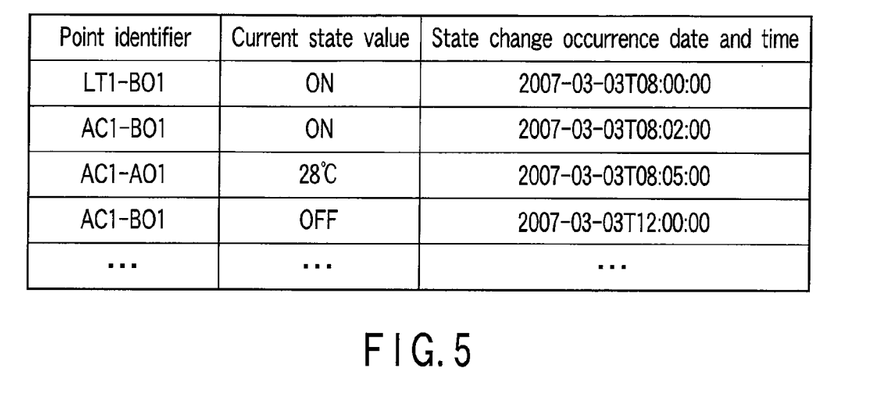
FIG. 5 is a view showing an example of how state change event information is stored in a state change history storage unit.

The state change acquisition unit 12 acquires the state change event information transmitted from each piece of the equipment on the network NW1 while the equipment set generation support apparatus 1 is operating. That is, upon receiving the state change event information transmitted from each equipment on the network NW1, the state change acquisition unit 12 stores the information in the state change history storage unit 15, as shown in FIG. 5.

In step S1, upon receiving search conditions from the user terminal 200 via the network NW2, the condition setting unit 11 stores them. Upon receiving a predetermined instruction from the user terminal 200 with respect to given specific facilities utilization schedule information stored in the facilities reservation system 250, the condition setting unit 11 extracts detection conditions from the facilities utilization schedule information and stores them. Upon receiving a predetermined instruction from the user terminal 200 with respect to the work record information of a given user which is stored in the security gate system 260, the condition setting unit 11 extracts detection conditions from the work record information and stores them.

Detection conditions include at least a user name and the start and end time points of a detection period, and can also include area information which designates a specific area.

After the lapse of the detection period designated as the above detection condition, the process advances to step S2, in which the detection unit 13 selects state change event information, of the state change event information stored in the state change history storage unit 15, whose state change occurrence date and time fall within the detection period designated as a detection condition.

If an area is designated as the above detection condition (step S3), the process advances to step S4. In step S4, the detection unit 13 refers to a point information table like that shown in FIG. 3 to select state change event information including the identifier of a point installed in the area designated as a detection condition from the state change event information selected in step S2.

In step S5, the detection unit 13 extracts the second equipment set from the state change event information selected in the above manner. First of all, in order to remove a state change due to a temporary operation error, the detection unit 13 compares the state at the start time point of the detection period of each point with the state at the end time point of the detection period and detects a point where state changes have occurred between the two time points. The identifiers (equipment identifiers) of equipment having the points (point identifiers) detected in this manner are read from the first equipment set table like that shown in FIG. 2 and are acquired as a second equipment set. The obtained second equipment set is stored in the second equipment set table in the cooperation information database 14 (step S6).

In step S5, the detection unit 13 acquires the values of the states at the end time point of the detection period as an operation set from the detected state change event information of each point, and stores the obtained operation set in the operation set table in the cooperation information database 14 (step S6).

Assume that a user "USER1" has set detection conditions including a time point a predetermined period before a facilities utilization scheduled start time as the start time point of a detection period, a time point a predetermined period after the scheduled start time as an end time point, and the third-floor south area as a designated area. In this case, the detection unit 13 obtains, from the detection conditions, a second equipment set and its operation set which include information such as information indicating that a point called the temperature setting unit AC1-AO1 of the air conditioner AC1 in the third-floor south area is set at a temperature of 28°, and information indicating that a point called the switch LT1-BO1 of the lighting device LT1 in the third-floor south area is set in the OFF state.

Figure 6:
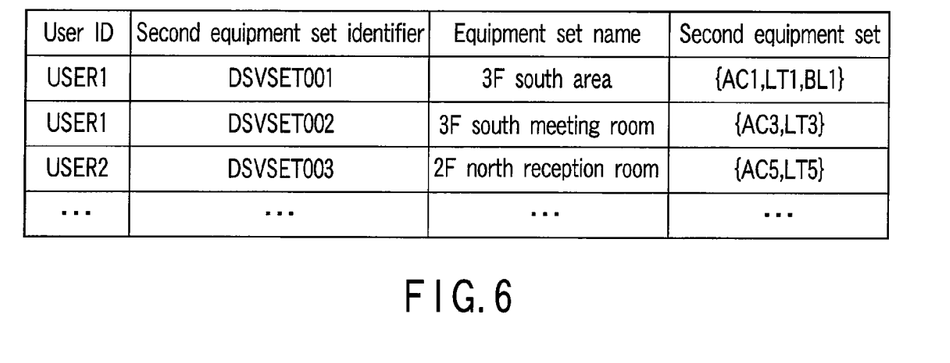
FIG. 6 is a view showing an example of a second equipment set table.

As shown in, for example, FIG. 6, the second equipment sets (sets of the identifiers of equipment) detected in the above manner are registered in the second equipment set table, together with equipment set names (e.g., area names included in the detection conditions or the names of areas where equipment belonging to the second equipment sets is mainly set), identifiers (second equipment set identifiers) automatically assigned from the system which identifies the second equipment sets, user IDs included in the detection conditions, and the like.

Figure 7:
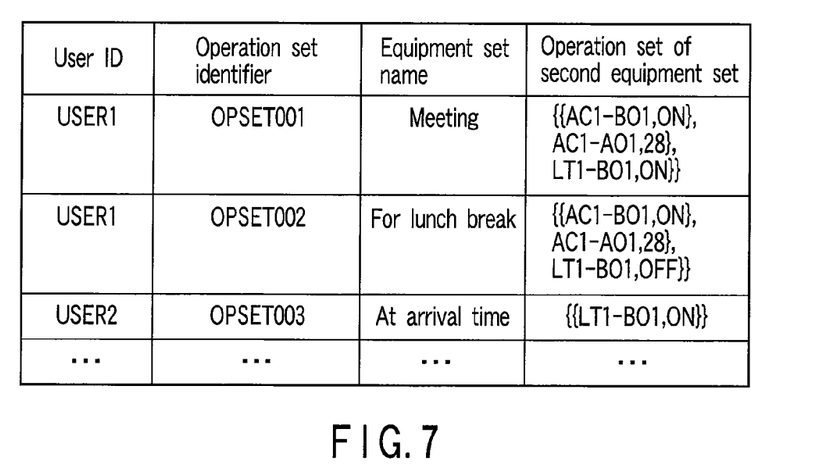
FIG. 7 is a view showing an example of an operation set table.

As shown in, for example, FIG. 7, operation sets including the point identifiers of the respective equipment belonging to the second equipment sets and the values of the states of the points are registered in the operation set table, together with operation set names (e.g., objects if included in the detection conditions, predetermined names to be used as operation set names, or arbitrary character strings), identifiers (operation set identifiers) automatically assigned from the system to identify the operation sets, user IDs included in the detection conditions, and the like.

As described above, according to the above embodiment, designating a detection period, an area, and the like as detection conditions makes it possible to easily detect a set of equipment (a second equipment set) operated in the area in the detection period or an operation set which indicates how the equipment is operated from the state change event information from each equipment (each point thereof).

The following is a concrete example of a detection period (a detection start time point and a detection end time point) designated as a detection condition.

It is often the case that in lunch breaks, lighting devices are turned off or dimmed to save energy. In such a case, if a user sets the start time of a lunch break or the like as a detection condition by using the user terminal 200, it is possible to detect lighting devices to be turned off (to be decreased in illuminance) at the start of a lunch break as a second equipment set and detect an operation set of the respective equipment belonging to the second equipment set. Note that in this case, a time a predetermined period before the start time of a lunch break is set as the start time point of a detection period, and a time a predetermined period after the start time of the lunch break is set as the end time point of the detection period.

Figure 4:
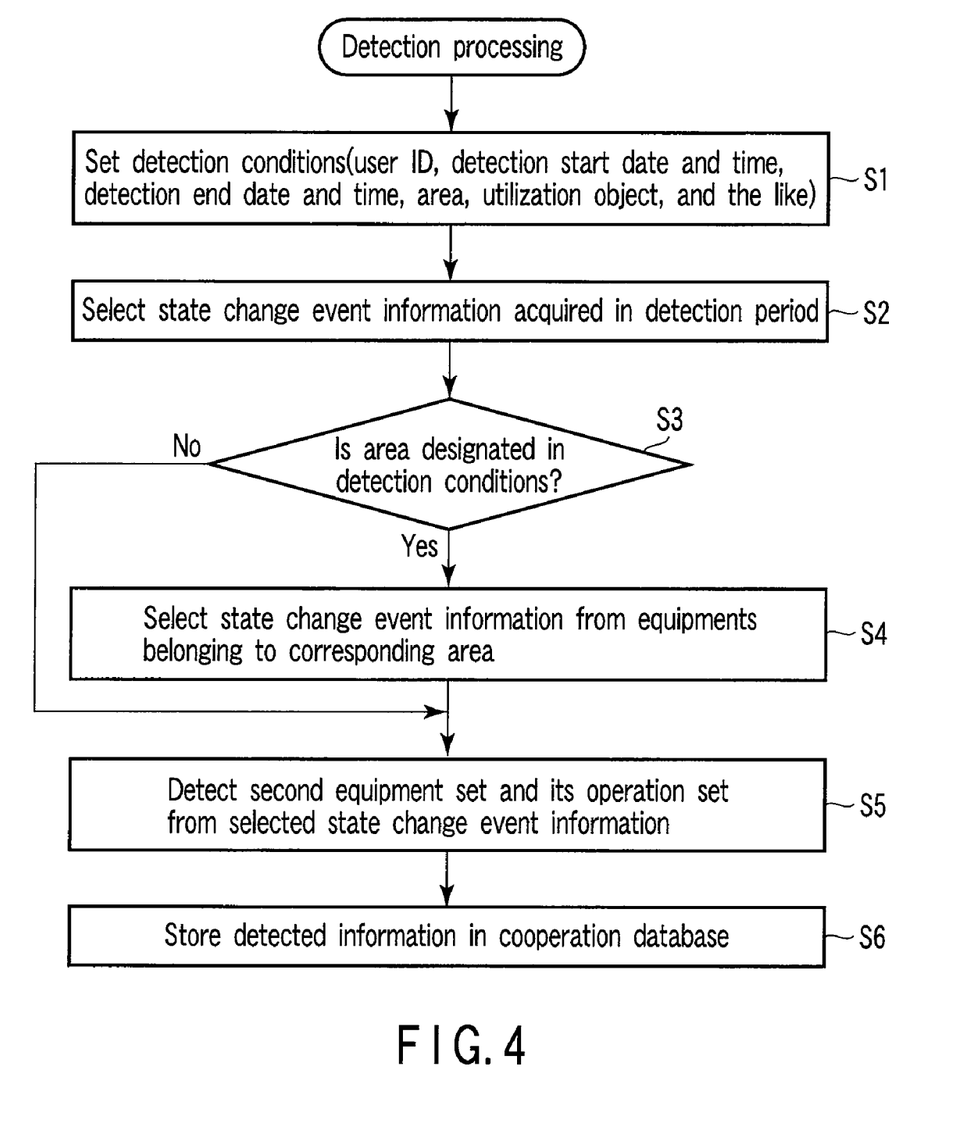
FIG. 4 is a flowchart for explaining detection processing operation for a second equipment set and an operation set in an equipment set generation support apparatus.

Likewise, if the user sets the end time of a lunch break or the like as a detection condition by using the user terminal 200, it is possible to detect lighting devices to be turned on (or to be returned to its initial illuminance) at the end of a lunch break as a second equipment set and detect an operation set of the respective equipment belonging to the second equipment set by the processing operation shown in FIG. 4. Note that in this case, a time a predetermined period before the end time of a lunch break is set as the start time point of a detection period, and a time a predetermined period after the end time of the lunch break is set as the end time point of the detection period.

The last person who leaves the office needs to turn off the power supplies of many pieces of equipment such as an air conditioner and a copying machine as well as lighting devices. It is not easy for the person to check all the equipment. For this reason, when the security gate system 260 detects the last person who leaves the office, the condition setting unit 11 sets detection conditions by setting a time point a predetermined period before the leaving time as the start time point of a detection period and setting a time point a predetermined period after the leaving time as the end time point of the detection period. With the processing operation shown in FIG. 4, it is possible to detect equipment to be turned off at the leaving time as a second equipment set and detect an operation set of the respective equipment belonging to the second equipment set.

It is also possible to detect a second equipment set and its operation set at the leaving time for each user. In this case, when the security gate system 260 detects that the user has left the office, the condition setting unit 11 sets detection conditions corresponding to the user by setting a time a predetermined period before the leaving time as a detection start time and setting a time a predetermined period after the leaving time as a detection end time. With this processing operation shown in FIG. 4, it is possible to detect equipment to be turned off or on at the leaving time of the user as a second equipment set and detect the operation set of the respective equipment belonging to the second equipment set.

Likewise, it is necessary to turn on the power supplies of necessary equipment at the arrival time. Although the following settings often vary depending on users, when the security gate system 260 detects the arrival of the user to the office, the condition setting unit 11 sets detection conditions corresponding to the user by setting a time a predetermined period before the arrival time as a detection start time and setting a time a predetermined period after the arrival time as a detection end time. With the processing operation shown in FIG. 4, it is possible to detect equipment to be turned on (or off) at the arrival time of the user as a second equipment set and detect the operation set of the respective equipment belonging to the second equipment set.

Obviously, if detection conditions further include a condition like an area, it is possible to detect a second equipment set and its operation set with higher accuracy.

As shown in FIG. 6, although an equipment set name is assigned to the detected second equipment set, when the second equipment set is detected, the user (corresponding to the user ID added to the second equipment set) may input/set a desired equipment set name from the user terminal 200.

As shown in FIG. 7, although operation set names are assigned to the detected operation set, when the operation set is detected, the user (corresponding to the user ID added to the operation set) may input/set desired operation set names from the user terminal 200.

Figure 8:
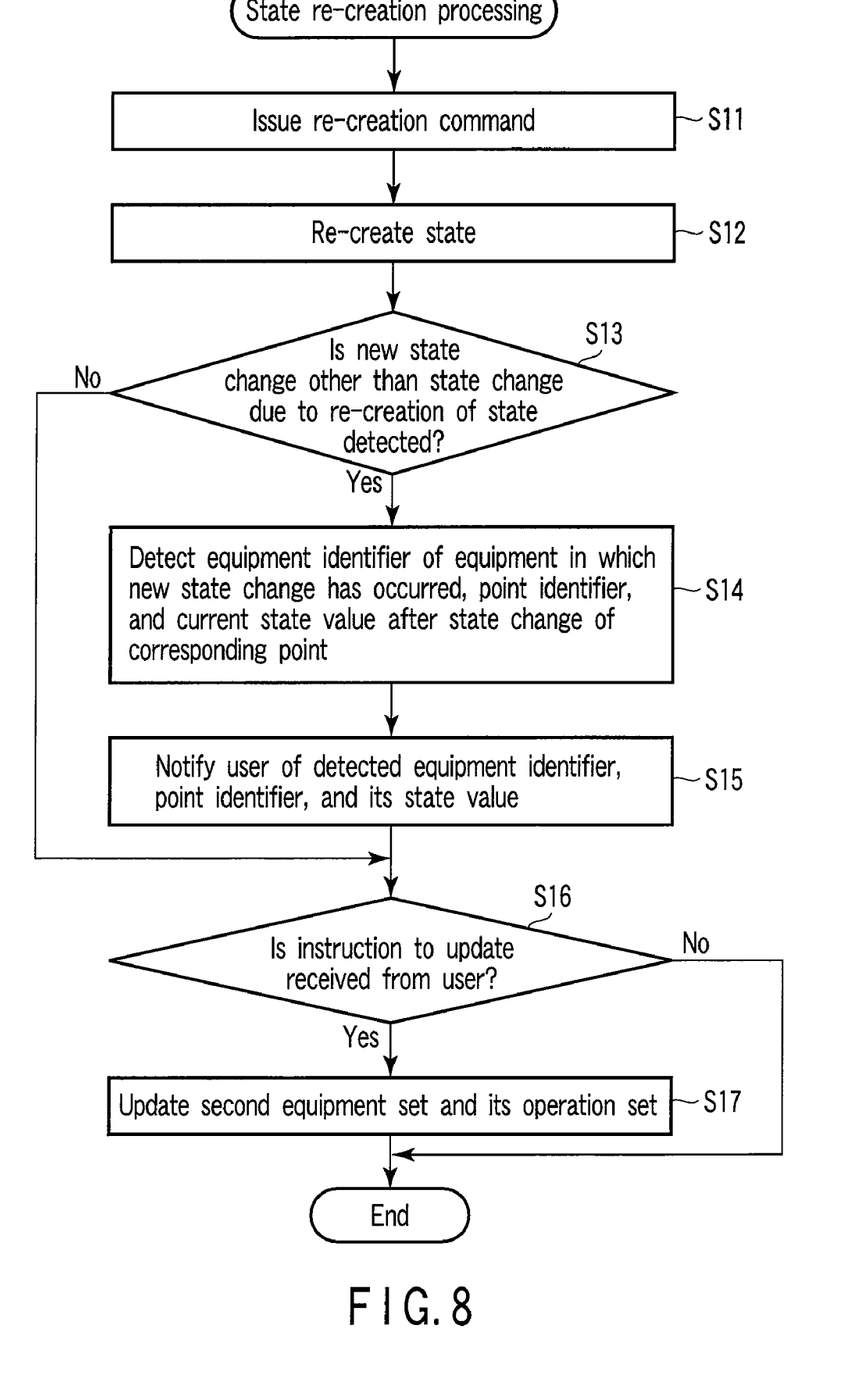
FIG. 8 is a flowchart for explaining re-creation processing operation of re-creating an operation set in a second equipment set in the equipment set generation support apparatus.

Processing operation for re-creating an operation set corresponding to the second equipment set on the network NW1 by using the second equipment set table in FIG. 6 and the operation set table in FIG. 7 will be described next with reference to the flowchart shown in FIG. 8.

Assume that re-creation conditions including a user ID, information (e.g., an operation set name or an operation set identifier) which can specify a desired operation set, and information (e.g., an object, area information, or a time zone like "at arrival time", "at leaving time", or "at facilities utilization start time") which specifies the timing at which the desired operation set is re-created are set in the re-creation command reception unit 20 in advance.

Upon detecting the state designated by the re-creation conditions from the user terminal 200, facilities utilization schedule information, work record information, or the like, the re-creation command reception unit 20 activates the re-creation control unit 21 to re-create the designated operation set.

Assume that re-creation conditions are set in advance, which indicate that when the user "USER1" arrives at the office, an operation set having the operation set name "at leaving time" of the user "USER1" is re-created.

For example, when the security gate system 260 detects the departure of the user "USER1", the re-creation command reception unit 20 activates the re-creation control unit 21 (step S11).

The re-creation control unit 21 reads the user ID "USER1" and an operation set corresponding to the operation set name "at leaving time" (in this case, "turn on point LT1-BO1 of equipment LT1") from an operation set table like that shown in FIG. 7 which is stored in the cooperation information database 14, and transmits a control message for turning on the point LT1-BO1 to the equipment controller LT-C1 of the equipment LT1 by using the obtained operation set (step S12).

Upon receiving the control message, the equipment controller LT-C1 turns on the point LT1-BO1.

The user checks the state re-creation result on the second equipment set which is obtained by the re-creation control unit 21, and can operate an equipment belonging to the second equipment set or a new equipment which does not belong to the second equipment set if necessary. When the re-creation control unit 21 re-creates the state of the second equipment set, the detection unit 13 detects a new state change other than the state change which occurs as a result of the re-creation of the state from the state change event information acquired by the state change acquisition unit 12 in a short period close to the re-creation time (step S13).

Upon detecting the new state change, the detection unit 13 detects, from the state change event information, the equipment identifier of the equipment in which the new state change has occurred, a point identifier, and a current state value after the state change of the point (step S14).

The information presentation unit 16 notifies the user terminal 200 of the user of the equipment identifier, point identifier, and its state value which are detected in step S14 (step S15).

If the user terminal 200 issues an instruction to update the second equipment set and the operation set so as to reflect the new state change upon receiving this notification (step S16), the detection unit 13 updates the original second equipment set and operation set in accordance with the detected equipment identifier, the corresponding point identifier, and its state value (step S17).

If the user checks the re-creation result on the operation set which is obtained by the re-creation control unit 21 and determines that the state of each point belonging to the operation set needs to be corrected, the user corrects each state from the user terminal 200, regardless of whether the detection unit 13 has detected a new state change in step S13 (steps S16 and S17). If the user wants to add/delete an equipment identifier, a point identifier, and its state value to/from the second equipment set and the operation set, he/she corrects the second equipment set and the operation set by using the user terminal 200 (steps S16 and S17).

When the re-creation control unit 21 has re-created the state values of the operation set for the second equipment set, the detection unit 13 sets the re-creation time as a detection start time point and a predetermined period (e.g., several minutes) after the re-creation time as a detection end time point. Alternatively, the detection unit 13 detects a new second equipment set and its operation set from the state change event information acquired by the state change acquisition unit 12 in this detection period as shown in FIG. 4 by using detection conditions with a time point several minutes before the re-creation time being set as a detection start time point and a time point several minutes after the re-creation time being set as a detection end time (if the detection conditions set at the time of detection of the operation set include an area, the detection conditions include the area).

The detection unit 13 compares the new second equipment set and the previously obtained second equipment set to generate difference information between them. If there is a piece of equipment which is not included in the previously obtained second equipment set but is included in the currently obtained new second equipment set, the detection unit 13 generates difference information including the equipment as an equipment to be recommended to be added. If there is a piece of equipment which is included in the previously obtained second equipment set but is not included in the currently obtained new second equipment set, the detection unit 13 generates different information including the equipment as an equipment to be recommended to be deleted. The information presentation unit 16 provides the generated different information to the user terminal 200 to be displayed, as required.

If the user wants to add/delete an equipment identifier, a point identifier, and its state value to/from the second equipment set and the operation set upon referring to such difference information, he/she corrects the corresponding second equipment set and the corresponding operation set by using the user terminal 200.

Likewise, the detection unit 13 compares the new operation set with the previously obtained operation set to generate difference information between them. If there is a point which is not included in the previously obtained operation set but is included in the currently obtained new operation set, the detection unit 13 generates difference information including the point as a point to be recommended to be added. If there is a point which is included in the previously obtained operation set but is not included in the currently obtained new operation set, the detection unit 13 generates difference information including the point as a point to be recommended to be deleted. In addition, if the state value of the point in the currently obtained new operation set differs from that of the point in the previously obtained operation set, the detection unit 13 generates difference information with the state value of the point in the currently obtained new operation set being set in a recommended state. The information presentation unit 16 provides the generated difference information to the user terminal 200 to be displayed, as required.

If the user refers to such difference information and determines to correct the state of each point belonging to the operation set, he/she corrects it by using the user terminal 200. If the user wants to add a new point and its state to the operation set, he/she corrects the operation set by using the user terminal 200.

The re-creation command reception unit 20 may set in advance re-creation conditions in accordance with the operation of the user terminal 200 by the user or may generate re-creation conditions from the facilities utilization schedule information stored in the facilities reservation system. If, for example, the facilities utilization schedule information is to be used, the information can include an operation set name, a user ID, and the like as re-creation conditions to re-create the state by using a desired operation set at the scheduled start time of facilities utilization.

As described above, the equipment management system in FIG. 1 allows the user terminal 200, the facilities reservation system 250, the security gate system 260, and the like to cooperate with each other.

Note that even if the network NW1 is constructed by a BACnet (A Data Communication Protocol for Building Automation and Control Networks), the above embodiment can be applied to the system.

As has been described above, according to the above embodiment, a set of equipment to be cooperated and a set of set values of the equipment set can easily extract from the population of equipment which can be operated.

A set of equipment (a second equipment set) which are made to cooperate with each other and a set of set values of the equipment (an operation set) can be easily extracted from a plurality of equipment. In addition, by re-creating the set of set values in the set of equipment, it can easily implement cooperating operation between equipment in conformity with users' objects.

What is claimed is:

1. An equipment set generation support apparatus comprising:
    an acquisition unit configured to acquire, from a plurality of equipments connected to a network, state change event information notifying a new state after a state change of each equipment and an occurrence time and date of the state change;
    a setting unit configured to set a detection condition including a start time and an end time of a detection period;
    a selection unit configured to select state change event information whose occurrence time and date of the state change falling within the detection period from the state change event information acquired by the acquisition unit;
    a first detection unit configured to detect, from the plurality of equipments, a set of equipments whose states change in the detection period and a set of state values after the state change of each equipment by comparing a start state at the start time of the detection period with an end state at the end time of the detection period based on the state change event information selected by the selection unit;
    a re-creation unit configured to re-create the set of state values in the set of equipment; and
    a second detection unit configured to detect, from the state change event information acquired by the acquisition unit after re-creating the set of state values in the set of equipments by the re-creation unit, a new state change other than state changes which occurs as a result of the re-creating the set of state values, to obtain a equipment in which the new state change occurred and the state value of the equipment.

2. The apparatus according to claim 1, wherein
    the detection condition includes area information which designates a specific area, and
    the selection unit selects, from the state change event information acquired by the acquisition unit, the state change event information which are acquired from equipments belongs to the specific area.

3. The apparatus according to claim 1, wherein the first detection unit detects the set of equipments whose states at the start of the detection period differs from those at the end of the detection period.

4. The apparatus according to claim 1, further comprising:
a memory to store the set equipment and the set of state values which are detected by the first detection unit.

5. The apparatus according to claim 1, further comprising:
a correcting unit configured to correct the set of equipments and the set of the state values based on the equipment and the state value obtained.

6. An equipment set generation support method comprising:
acquiring, in an acquisition unit, from a plurality of equipments connected to a network, state change event information notifying a new state after a state change of each equipment and an occurrence time and date of the state change;
setting, in a setting unit, a detection condition including a start time and an end time of a detection period;
selecting, in a selecting unit, state change event information whose occurrence time and date of the state change falling within the detection period from the state change event information acquired;
detecting, in a first detecting unit, from the plurality of equipments, a set of equipments whose states change in the detection period and a set of state values after the state change of each equipment by comparing a start state at the start time of the detection period with an end state at the end time of the detection period based on the state change event information selected;
re-creating the set of state values in the set of equipments;
acquiring state change event information from the set of equipments after re-creating; and
detecting, from the state change event information acquired after the re-creating, a new state change other than state changes which occurs as a result of the re-creating the set of state values, to obtain an equipment in which the new state change has occurred and the state value of the equipment after the new state change.

7. The method according to claim 6, wherein
the detection condition includes area information which designates a specific area, and
selecting the state change event information selects, from the state change event information acquired, the state change event information which are acquired from equipments belongs to the specific area.

8. The method according to claim 6, wherein detecting the set of equipments detects the set of equipments whose states at the start of the detection period differs from those at the end of the detection period.

9. The method according to claim 6, further comprising:
correcting the set of equipments and the set of the state values based on the equipment and the state value obtained.

* * * * *